(12) United States Patent
Chu

(10) Patent No.: US 11,338,787 B2
(45) Date of Patent: May 24, 2022

(54) HYDRAULIC SWITCH AND HYDRAULIC BRAKE SYSTEM

(71) Applicant: TEKTRO TECHNOLOGY CORPORATION, Changhua County (TW)

(72) Inventor: En-Liang Chu, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 471 days.

(21) Appl. No.: 16/398,693

(22) Filed: Apr. 30, 2019

(65) Prior Publication Data
US 2019/0348239 A1 Nov. 14, 2019

(30) Foreign Application Priority Data
May 14, 2018 (TW) .................................. 107116249

(51) Int. Cl.
| | | |
|---|---|---|
| *B60T 17/22* | (2006.01) | |
| *F16D 55/22* | (2006.01) | |
| *H01H 35/38* | (2006.01) | |
| *F16D 65/00* | (2006.01) | |
| *F16D 65/28* | (2006.01) |

(Continued)

(52) U.S. Cl.
CPC ............... *B60T 17/22* (2013.01); *F16D 55/22* (2013.01); *F16D 65/00* (2013.01); *F16D 65/28* (2013.01); *H01H 35/38* (2013.01); *B62L 3/023* (2013.01); *F16D 2121/04* (2013.01); *F16D 2121/14* (2013.01); *F16D 2125/64* (2013.01)

(58) Field of Classification Search
CPC ......... H01H 35/38; F16D 55/22; F16D 65/00; F16D 65/28; F16D 2121/04; F16D 2121/14; F16D 2125/64; B62J 6/16; B62L 3/023
See application file for complete search history.

(56) References Cited

U.S. PATENT DOCUMENTS 2,498,683 A * 2/1950 Hubbell ............. H01H 36/0073
200/571
2,568,476 A * 9/1951 Weirich ................. H01J 37/66
335/145

(Continued)

*Primary Examiner* — Robert A. Siconolfi
*Assistant Examiner* — James K Hsiao
(74) *Attorney, Agent, or Firm* — Locke Lord LLP; Tim Tingkang Xia, Esq.

(57) ABSTRACT

The disclosure provides a hydraulic switch including a casing, a first cable, a second cable, an electrically conductive piston and a first magnetic conductive component. The casing has a chamber and a liquid channel connected to the chamber. The first cable is disposed through the casing, and the first electrical connection portion of that is located in the chamber. The second cable is disposed through the casing, and a second electrical connection portion of that is located in the chamber. The electrically conductive piston movably is disposed in the chamber. When the electrically conductive piston is in an electrically connected position, the electrically conductive piston is in electrical contact with the first electrical connection portion and the second electrical connection portion. The first magnetic conductive component is configured to provide a magnetic force to move the electrically conductive piston toward an electrically disconnected position.

20 Claims, 9 Drawing Sheets

(51) Int. Cl.
*F16D 121/14* (2012.01)
*F16D 125/64* (2012.01)
*B62L 3/02* (2006.01)
*F16D 121/04* (2012.01)

(56) References Cited

U.S. PATENT DOCUMENTS

| | | | | |
|---|---|---|---|---|
| 3,109,908 | A * | 11/1963 | Clason | H01H 36/00 |
| | | | | 200/83 J |
| 3,293,579 | A * | 12/1966 | Harper | G01F 23/70 |
| | | | | 335/207 |
| 3,564,175 | A * | 2/1971 | Cooper | H01H 35/38 |
| | | | | 200/82 R |
| 3,611,220 | A * | 10/1971 | Hoffman | H01H 36/0073 |
| | | | | 335/207 |
| 3,766,779 | A * | 10/1973 | Hoffman | G01P 5/02 |
| | | | | 73/861.61 |
| 3,982,217 | A * | 9/1976 | Reynolds | H01H 35/32 |
| | | | | 335/207 |
| 4,025,885 | A * | 5/1977 | Giannini | H01H 36/0073 |
| | | | | 335/154 |
| 4,237,354 | A * | 12/1980 | Rockenfeller | H01H 35/247 |
| | | | | 200/83 C |
| 4,361,829 | A * | 11/1982 | Kramholler | B62J 6/05 |
| | | | | 340/475 |
| 4,586,021 | A * | 4/1986 | Nickols | B62J 6/04 |
| | | | | 340/432 |
| 4,833,444 | A * | 5/1989 | Wisniewski | B62J 6/04 |
| | | | | 340/432 |
| 4,963,857 | A * | 10/1990 | Sackett | G01P 13/002 |
| | | | | 116/267 |
| 4,967,179 | A * | 10/1990 | Solini | B62J 1/00 |
| | | | | 340/432 |
| 5,504,662 | A * | 4/1996 | Huang | B62J 6/04 |
| | | | | 362/473 |
| 5,529,460 | A * | 6/1996 | Eihusen | B08B 3/026 |
| | | | | 417/20 |
| 6,255,609 | B1 * | 7/2001 | Samuelson | G01L 9/0089 |
| | | | | 200/82 E |
| 6,528,748 | B2 * | 3/2003 | Harris | H01H 35/405 |
| | | | | 200/81.9 M |
| 7,786,392 | B2 * | 8/2010 | Hickman | H01H 35/34 |
| | | | | 200/83 R |
| 7,978,037 | B2 * | 7/2011 | Yamada | H01H 36/008 |
| | | | | 335/205 |
| 8,258,902 | B2 * | 9/2012 | Lee | H01H 1/54 |
| | | | | 335/207 |
| D775,377 | S * | 12/2016 | Woram | D26/28 |
| 2005/0099277 | A1* | 5/2005 | Hsu | B62J 6/04 |
| | | | | 340/432 |
| 2007/0205777 | A1* | 9/2007 | Walter | G01D 21/00 |
| | | | | 324/691 |
| 2007/0222282 | A1* | 9/2007 | Thurm | B60T 17/04 |
| | | | | 303/9.64 |
| 2009/0229964 | A1* | 9/2009 | Hickman | H01H 35/34 |
| | | | | 200/83 R |
| 2011/0023616 | A1* | 2/2011 | Kiyama | H01H 35/2614 |
| | | | | 73/700 |
| 2011/0044064 | A1* | 2/2011 | Hu | B62J 6/00 |
| | | | | 362/473 |
| 2011/0073420 | A1* | 3/2011 | Nagel | B60T 17/22 |
| | | | | 188/152 |
| 2012/0167537 | A1* | 7/2012 | Corriher | F16D 55/22 |
| | | | | 56/14.7 |
| 2013/0307678 | A1* | 11/2013 | Ransom | B62J 6/04 |
| | | | | 340/432 |
| 2020/0332793 | A1* | 10/2020 | Simmons | F04B 53/109 |

\* cited by examiner

US 11,338,787 B2

HYDRAULIC SWITCH AND HYDRAULIC BRAKE SYSTEM

CROSS-REFERENCE TO RELATED APPLICATIONS

This non-provisional application claims priority under 35 U.S.C. § 119(a) on Patent Application No(s). 107116249 filed in Taiwan, R.O.C on May 14, 2018, the entire contents of which are hereby incorporated by reference.

TECHNICAL FIELD

The disclosure relates to a hydraulic switch and a hydraulic brake system, more particularly a hydraulic switch and a hydraulic brake system that use oil pressure to push a piston for electrically connecting a circuit.

BACKGROUND

In recent years, road bikes, mountain bikes and other types of bikes become more and more popular so that the manufacturers not only pay more attention on developing new and market-oriented products in order to provide costumers a better riding experience and a more stylish appearance of bicycle, but also attempt to increase the safety in riding bicycle. For example, most of the bicycles are equipped with a brake lamp for warming road users.

In general, the brake lamp is controlled by a switch which is incorporated with a hydraulic brake system on the bicycle. In detail, when a bicycle brake lever is squeezed to cause brake oil to apply oil pressure, the oil pressure moves a piston inside the switch so as to form a circuit loop to turn on the brake lamp. As the brake lever is released, a spring will move the piston back so that the circuit loop is disconnected and the brake lamp goes off.

SUMMARY OF THE INVENTION

One embodiment of the disclosure provides a hydraulic switch. The hydraulic switch includes a casing, a first cable, a second cable, an electrically conductive piston and a first magnetic conductive component. The casing has a chamber and a liquid channel connected to the chamber. The first cable has a first electrical connection portion. The first cable is disposed through the casing, and the first electrical connection portion is located in the chamber. The second cable has a second electrical connection portion. The second cable is disposed through the casing, and the second electrical connection portion is located in the chamber. The electrically conductive piston is disposed in the chamber and movable between an electrically connected position and an electrically disconnected position. The electrically disconnected position is located closer to the liquid channel than the electrically connected position. When the electrically conductive piston is in the electrically connected position, the electrically conductive piston is in electrical contact with the first electrical connection portion and the second electrical connection portion so as to electrically connect the first cable with the second cable. When the electrically conductive piston is in the electrically disconnected position, the electrically conductive piston is spaced apart from the first electrical connection portion and the second electrical connection portion. The first magnetic conductive component is disposed on the electrically conductive piston and configured to provide a magnetic force to move the electrically conductive piston toward the electrically disconnected position.

Another embodiment of the disclosure provides a hydraulic switch. The hydraulic switch includes a casing, a first cable, a second cable, an electrically conductive piston and a first magnetic conductive component. The casing has a chamber and a liquid channel connected to the chamber. The first cable is disposed through the casing and electrically insulated with the casing. The first cable has a first electrical connection portion, and the first electrical connection portion is located in the chamber. The second cable is disposed on the casing. The second cable has a second electrical connection portion, and the second electrical connection portion is electrically connected to the casing. The electrically conductive piston is disposed in the chamber and in electrical contact with the casing. The electrically conductive piston is movable between an electrically connected position and an electrically disconnected position, and the electrically disconnected position is located closer to the liquid channel than the electrically connected position. When the electrically conductive piston is in the electrically connected position, the electrically conductive piston is in electrical contact with the first electrical connection portion so as to electrically connect the first cable with the second cable. When the electrically conductive piston is in the electrically disconnected position, the electrically conductive piston is spaced apart from the first electrical connection portion. The first magnetic conductive component is disposed on the electrically conductive piston and configured to provide a magnetic force to move the electrically conductive piston toward the electrically disconnected position.

Still another embodiment of the disclosure provides a hydraulic brake system. The hydraulic brake system includes a caliper and the aforementioned hydraulic switch. The caliper has an oil inlet. The hydraulic switch is disposed in the oil inlet of the caliper.

Yet another embodiment of the disclosure provides a hydraulic brake system. The hydraulic brake system includes a caliper, a brake lever, the aforementioned hydraulic switch and a three-way connector. The three-way connector has a first opening, a second opening and a third opening that are respectively connected to the caliper, the brake lever and the hydraulic switch.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
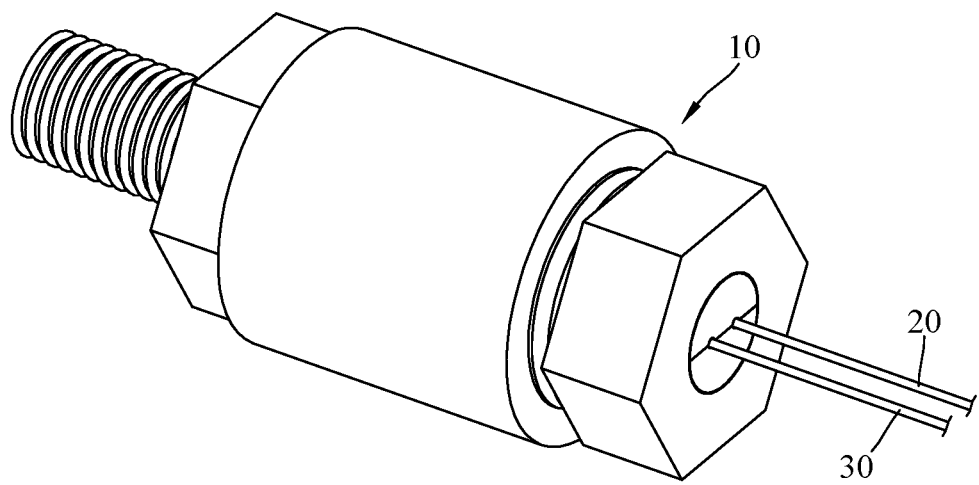
FIG. 1 is a perspective view of a hydraulic switch according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
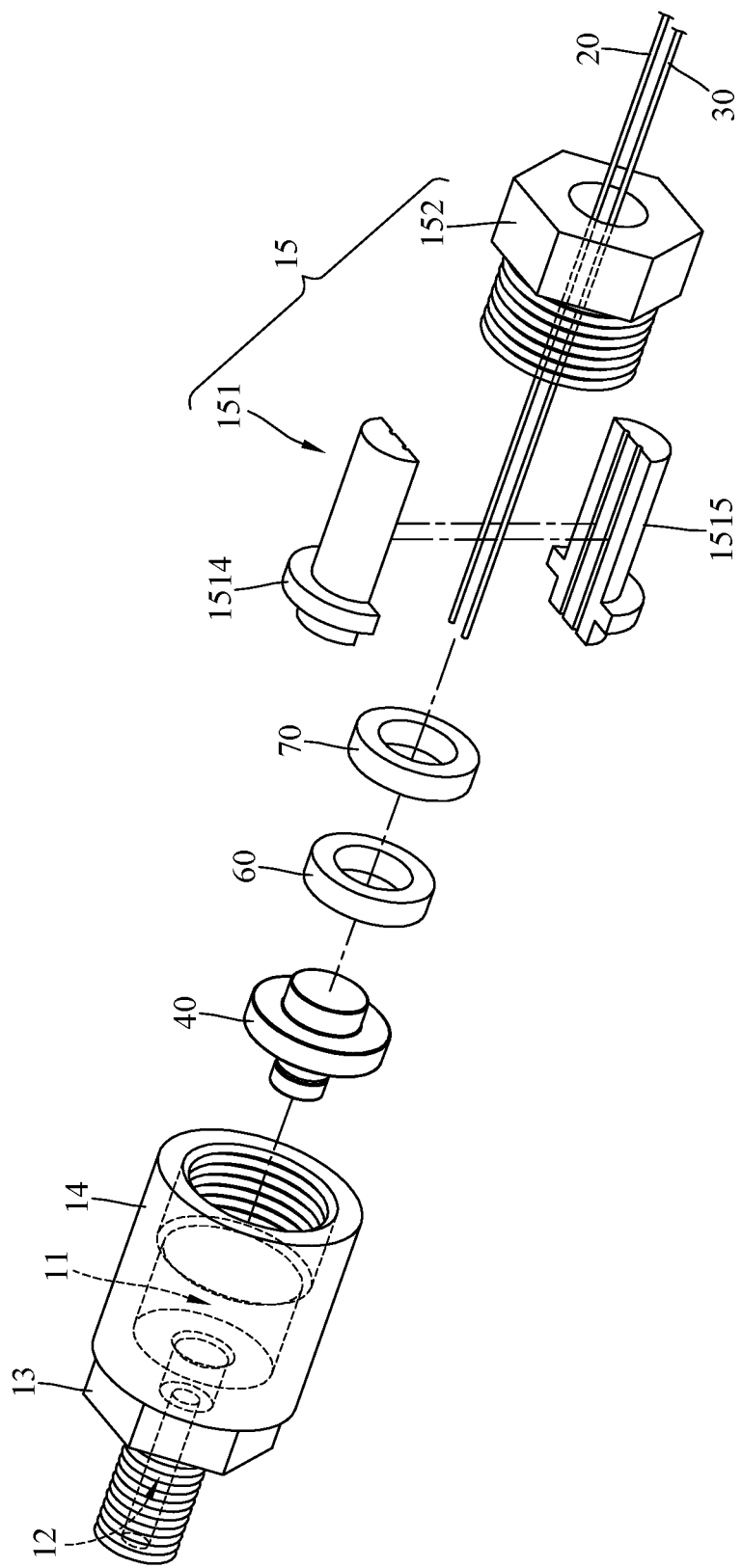
FIG. 2 is an exploded view of the hydraulic switch in FIG. 1.
Figure 3:
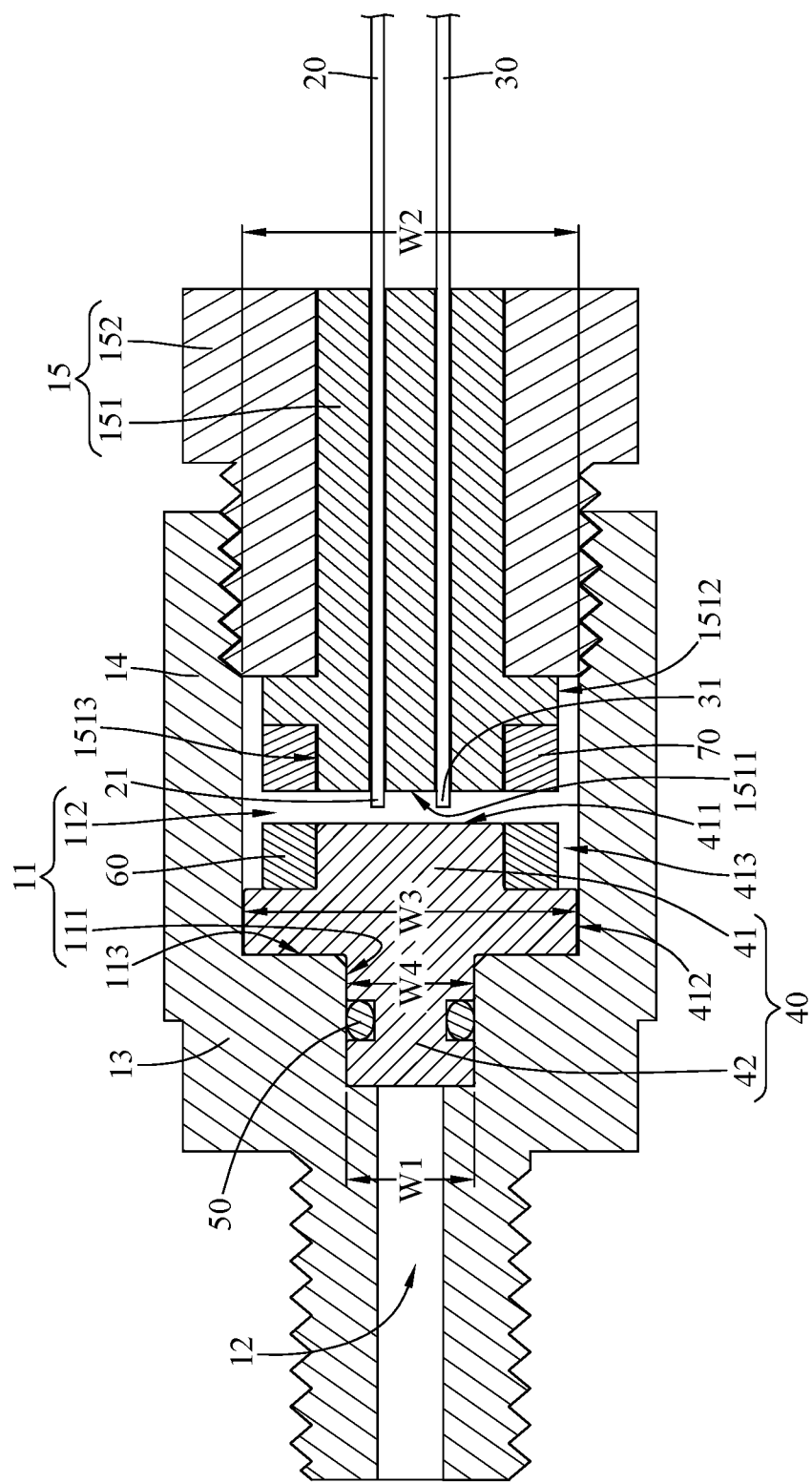
FIG. 3 is a cross-sectional view of the hydraulic switch in FIG. 1.

Please refer to FIGS. 1 to 3. FIG. 1 is a perspective view of a hydraulic switch according to a first embodiment of the disclosure. FIG. 2 is an exploded view of the hydraulic switch in FIG. 1. FIG. 3 is a cross-sectional view of the hydraulic switch in FIG. 1.

This embodiment provides a hydraulic switch 1 The hydraulic switch 1 is disposed on, for example, an oil pressure tube of a bicycle so as to control the brake lamp using oil pressure. However, the hydraulic switch 1 is not restricted to control the brake lamp; in some other embodiments, the hydraulic switch 1 may be used to control any device which is able to be switched by hydraulic pressure. In detail, the hydraulic switch 1 includes a casing 10, a first cable 20, a second cable 30, an electrically conductive piston 40, a sealing ring 50, a first magnetic conductive component 60 and a second magnetic conductive component 70.

The casing 10 has a chamber 11 and a liquid channel 12 connected to each other. In specific, the casing 10 includes an end part 13, an annular part 14 and a wire fixing part 15. The annular part 14 is connected to and located between the end part 13 and the wire fixing part 15, and the end part 13, the wire fixing part 15 and the 14 together form the chamber 11. The liquid channel 12 penetrates through the end part 13. The wire fixing part 15 includes an inner part 151 and an outer part 152. The outer part 152 is sleeved on the inner part 151 and is mounted to the annular part 14. In this embodiment, the outer part 152 of the wire fixing part 15 is, for example, screwed to the annular part 14. The chamber 11 includes a first portion 111 and a second portion 112 connected to each other. The first portion 111 is connected to the liquid channel 12 and is located between the liquid channel 12 and the second portion 112, and the width W1 of the first portion 111 is smaller than the width W2 of the second portion 112. The end part 13 has a stop surface 113 between the first portion 111 and the second portion 112.

In this embodiment, the first cable 20 and the second cable 30 are electrically connected to the brake lamp (not shown), and the first cable 20 and the second cable 30 respectively have a first electrical connection portion 21 and a second electrical connection portion 31. The first cable 20 and the second cable 30 is disposed through the inner part 151 of the wire fixing part 15, and the first electrical connection portion 21 and the second electrical connection portion 31 are located in the second portion 112 of the chamber 11. In detail, the inner part 151 is consisted of a first main body 1514 and a second main body 1515; that is the inner part 151 can be disassembled into two pieces. Both the first cable 20 and the second cable 30 are partially clamped by the first main body 1514 and the second main body 1515, and the outer part 152 is sleeved on both the first main body 1514 and the second main body 1515.

Note that the configuration of the inner part 151 is not restricted; in some other embodiments, the inner part may be made of a single piece.

The electrically conductive piston 40 includes a wide portion 41 and a narrow portion 42 connected to each other, and the width W3 of the wide portion 41 is greater than the width W4 of the narrow portion 42. The wide portion 41 is located in the second portion 112, and the narrow portion 42 is located in the first portion 111. The width W3 of the wide portion 41 is greater than the width W1 of the first portion 111. In this embodiment, the electrically conductive piston 40 is movable between an electrically connected position and an electrically disconnected position, and the electrically disconnected position is located closer to the liquid channel 12 than the electrically connected position. In this embodiment, by moving the electrically conductive piston 40 between the electrically connected position and the electrically disconnected position, the brake lamp can be turned on or turned off, and the detail descriptions will be described in later paragraphs.

The sealing ring 50 is sleeved on the narrow portion 42 of the electrically conductive piston 40 and clamped by the narrow portion 42 and the end part 13 of the casing 10 in order to prevent liquid in the liquid channel 12 from entering into the side of the wide portion 41 opposite the narrow portion 42.

The wide portion 41 of the electrically conductive piston 40 has a first end surface 411, a first annular surface 412 and a first recess 413. The first end surface 411 faces the inner part 151 of the wire fixing part 15 and is connected to the first annular surface 412. Two adjacent sides of the first recess 413 are respectively connected to the first annular surface 412 and the first end surface 411. The first magnetic conductive component 60 is, for example, a magnet in an annular shape. The first magnetic conductive component 60 is disposed in the first recess 413. In addition, the inner part 151 of the wire fixing part 15 has a second end surface 1511, a second annular surface 1512 and a second recess 1513. The second end surface 1511 faces the wide portion 41 of the electrically conductive piston 40 and is connected to the second annular surface 1512, and two adjacent sides of the second recess 1513 are respectively connected to the second annular surface 1512 and the second end surface 1511. The second magnetic conductive component 70 is, for example, a magnet in an annular shape. The second magnetic conductive component 70 is disposed in the second recess 1513 and surrounds the first cable 20 and the second cable 30. In this embodiment, the first magnetic conductive component 60 and the second magnetic conductive component 70 are set to repel each other, and the interaction between the first magnetic conductive component 60 and the second magnetic conductive component 70 can force the electrically conductive piston 40 to move toward the electrically disconnected position.

Figure 4:
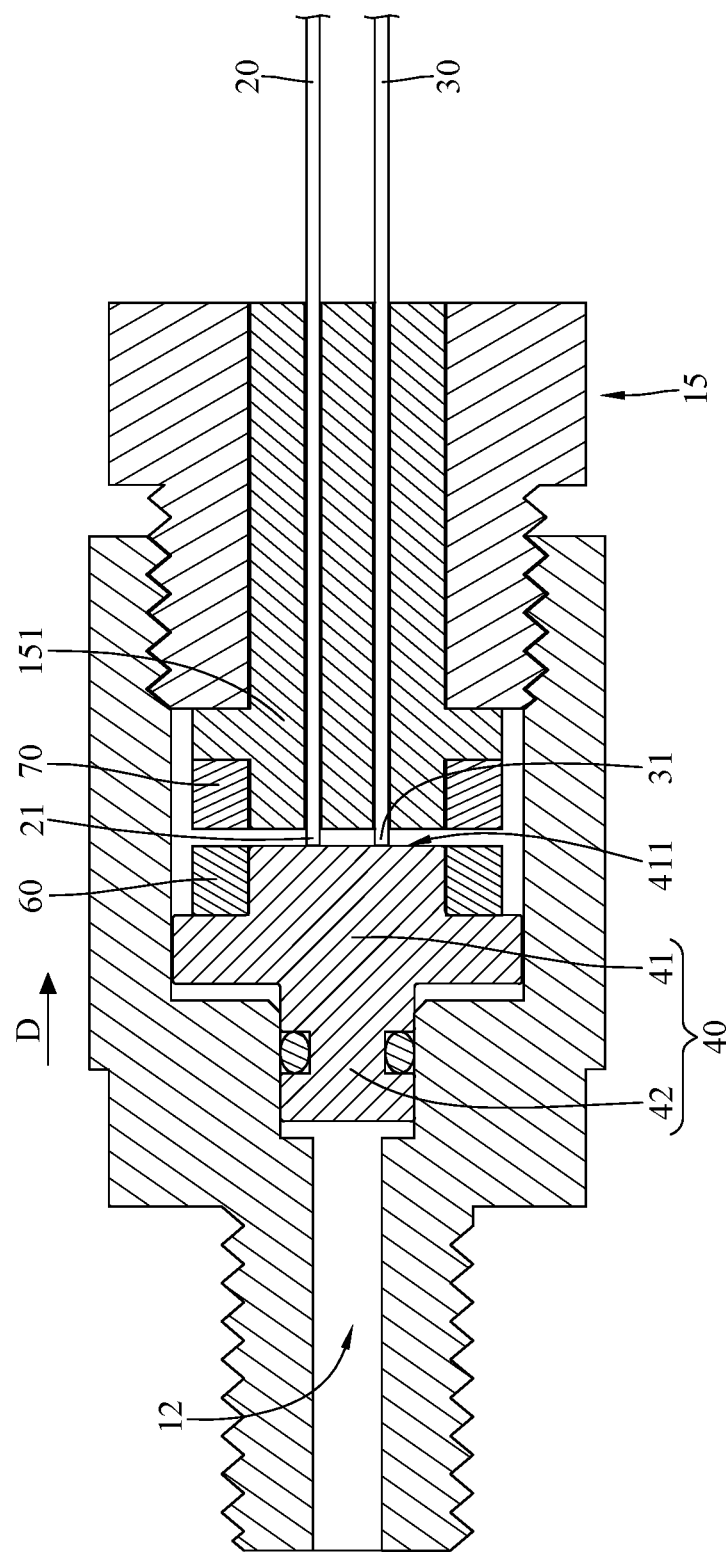
FIG. 4 is a cross-sectional view of the hydraulic switch in FIG. 1 when an electrically conductive piston is in an electrically connected position.

Then, the following paragraphs will illustrate how the brake lamp of the bicycle is controlled by the electrically conductive piston 40. Please refer to FIG. 4, and FIG. 4 is a cross-sectional view of the hydraulic switch in FIG. 1 when an electrically conductive piston is in an electrically connected position.

Firstly, when a brake lever is squeezed to cause the brake oil to applied oil pressure to the caliper for braking the bicycle, the brake oil also enters into the liquid channel 12. At this moment, the brake oil in the liquid channel 12 will apply oil pressure that is able to overcome the repulsion force between the first magnetic conductive component 60 and the second magnetic conductive component 70. As a result, the electrically conductive piston 40 is moved toward the inner part 151 of the wire fixing part 15 and can be moved to the electrically connected position along a direction D. When the electrically conductive piston 40 is in the electrically connected position, the first end surface 411 of the wide portion 41 of electrically conductive piston 40 is in electrical contact with the first electrical connection portion 21 and the second electrical connection portion 31, such that the first cable 20 is electrically connected to the second cable 30, thereby forming a circuit loop of the brake lamp to turn on the brake lamp.

In this embodiment, the entire electrically conductive piston 40 is made of electrically conductive material, but the present disclosure is not limited thereto; in some other embodiments, the piston may only have a portion where the first end surface 411 of the wide portion 41 is located made of electrically conductive material.

Then, as the brake lever is released, the oil pressure capable of moving the electrically conductive piston 40 is canceled, and then the repulsion force between the first magnetic conductive component 60 and the second magnetic conductive component 70 will be able to force the electrically conductive piston 40 to move back to the electrically disconnected position. When the electrically conductive piston 40 is in the electrically disconnected position, the wide portion 41 of the electrically conductive piston 40 is in contact with the stop surface 113, and the wide portion 41 of the electrically conductive piston 40 is spaced apart from the first electrical connection portion 21 and the second electrical connection portion 31. At this moment, the fire cable 20 and the second cable 30 are disconnected from each other so that the brake lamp is turned off.

In this embodiment, the second portion 112 of the chamber 11 and the first portion 111 of the chamber 11 have different widths, but the disclosure is not limited thereto. In some other embodiments, the electrically conductive piston may be a cylinder so that the first portion and the second portion may have the same width.

In this embodiment, the electrically conductive piston 40 is moved by using the repulsion force between the first magnetic conductive component 60 and the second magnetic conductive component 70, such that the overall volume of the hydraulic switch 1 can be small comparing to using spring to move the piston. Therefore, the hydraulic switch 1 has a smaller effect on the appearance of the bicycle.

In the disclosure, the location of the second magnetic conductive component is not restricted. For example, please refer to FIG. 5 to see a cross-sectional view of a hydraulic switch according to a second embodiment of the disclosure.

This embodiment provides another hydraulic switch similar to the hydraulic switch 1 of the previous embodiment. Therefore, only the differences between them will be described in the following paragraphs.

Figure 5:
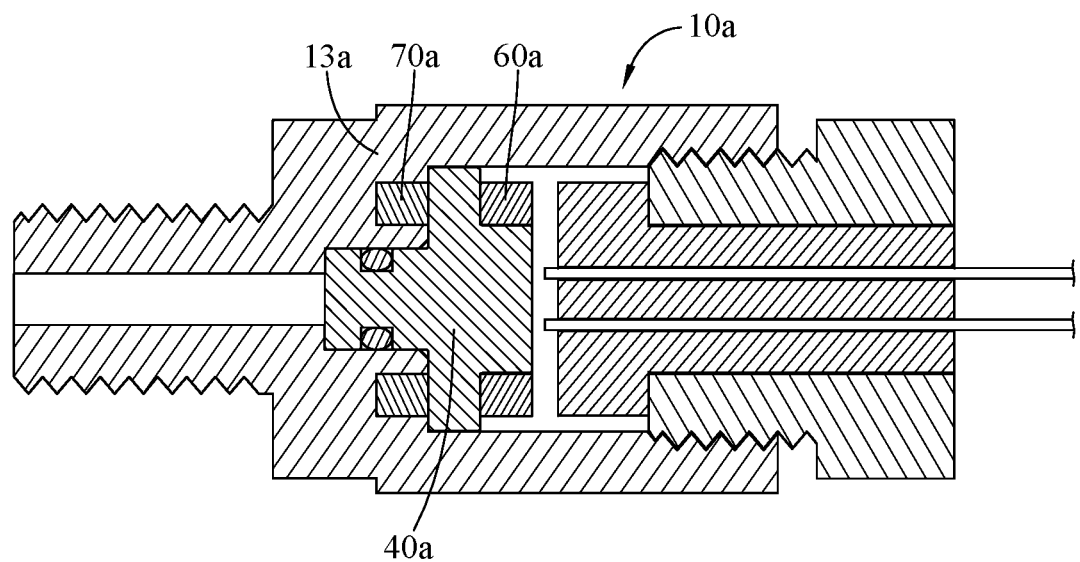
FIG. 5 is a cross-sectional view of a hydraulic switch according to a second embodiment of the disclosure.

As shown in FIG. 5, a second magnetic conductive component 70a is disposed on an end part 13a of a casing 10a, and the second magnetic conductive component 70a and a first magnetic conductive component 60a are attracted to each other. An electrically conductive piston 40a can be moved from an electrically connected position to an electrically disconnected position by the attraction force between the first magnetic conductive component 60a and the second magnetic conductive component 70a.

In this embodiment, the first magnetic conductive component 60a and the second magnetic conductive component are magnets, but the present disclosure is not limited thereto; in some other embodiments, the first magnetic conductive component 60a may be made of ferrous material, such as iron, cobalt or nickel. In such a case, the electrically conductive piston 40a can also be moved from the electrically connected position to the electrically disconnected position by the attraction force between the second magnetic conductive component 70a and the first magnetic conductive component 60a. Interchangeably, in another embodiment, the second magnetic conductive component 70a may be made of the ferrous material, and the first magnetic conductive component 60a may be a magnet.

Figure 6:
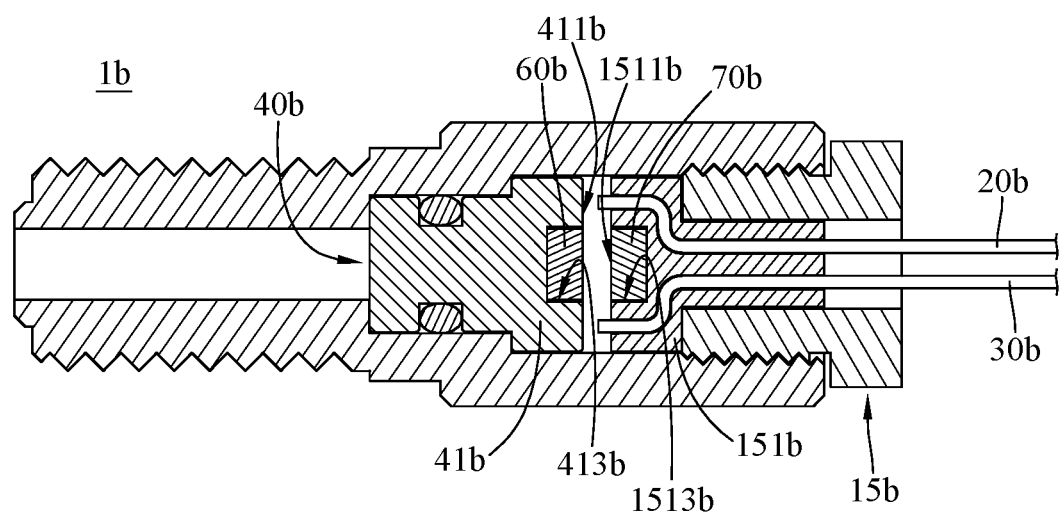
FIG. 6 is a cross-sectional view of a hydraulic switch according to a third embodiment of the disclosure.
Figure 7:
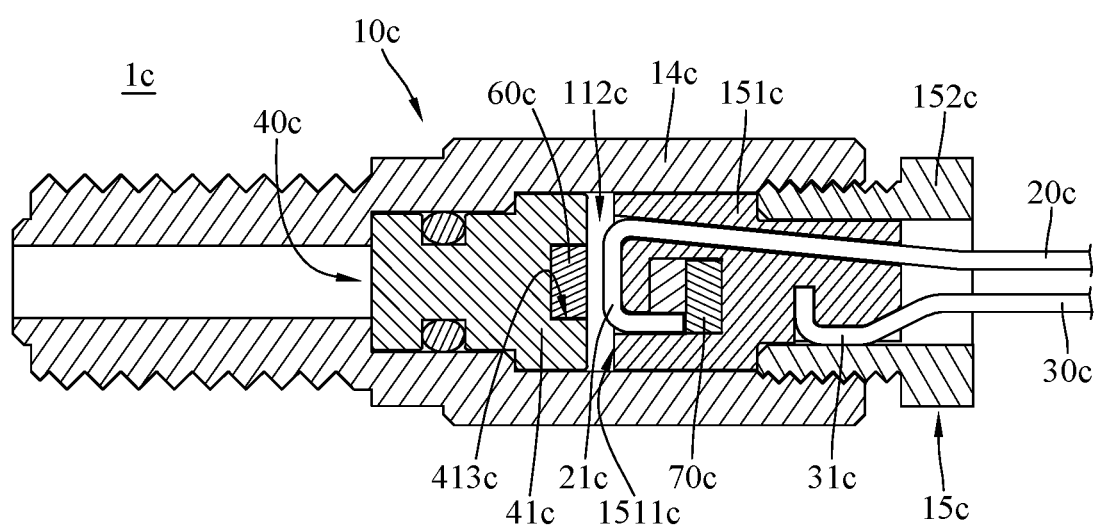
FIG. 7 is a cross-sectional view of a hydraulic switch according to a fourth embodiment of the disclosure.
Figure 8:
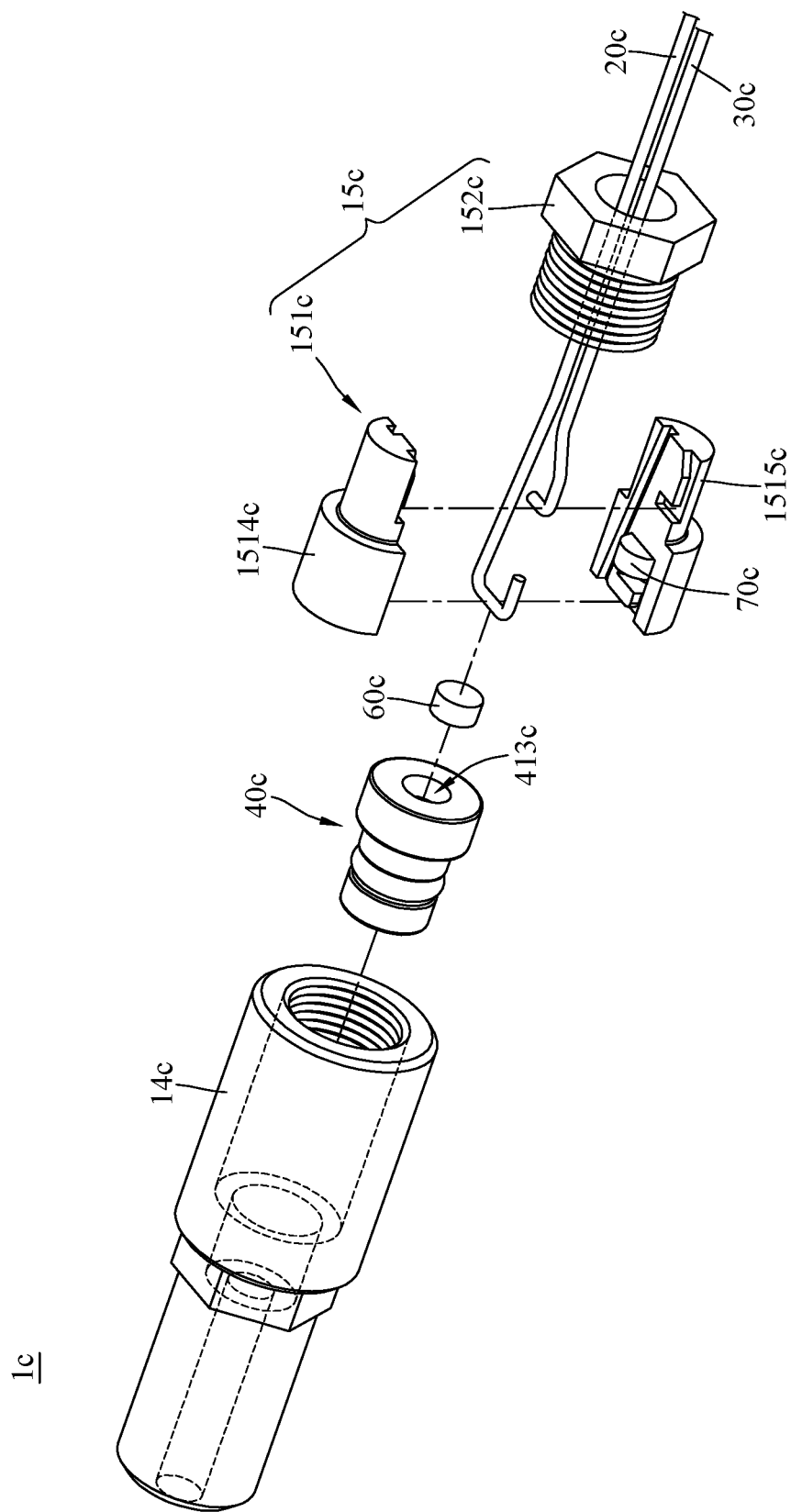
FIG. 8 is an exploded view of the hydraulic switch in FIG. 7.

Further, in the embodiment shown in FIG. 3, the second magnetic conductive component 70 surrounds the first cable 20 and the second cable 30, but the present disclosure is not limited thereto. For example, please refer to FIGS. 6 to 8, FIG. 6 is a cross-sectional view of a hydraulic switch according to a third embodiment of the disclosure, FIG. 7 is a cross-sectional view of a hydraulic switch according to a fourth embodiment of the disclosure, and FIG. 8 is an exploded view of the hydraulic switch in FIG. 7. The following embodiments provides two hydraulic switches 1b and 1c respectively shown in FIGS. 6 and 7. The hydraulic switches 1b and 1c are similar to the hydraulic switch 1 shown in FIG. 3. Therefore, only the differences between them will be described in the following paragraphs.

As shown in FIG. 6, in the hydraulic switch 1b, both of a first magnetic conductive component 60b and a second magnetic conductive component 70b are, for example, magnets in circle shapes. A first recess 413b of a wide portion 41b of an electrically conductive piston 40b is located at a first end surface 411b of the wide portion 41b, and a second recess 1513b of an inner part 151b of a wire fixing part 15 is located at a second end surface 1511b of the inner part 151b. The first magnetic conductive component 60b is disposed in the first recess 413b and is flush to the first end surface 411b. The second magnetic conductive component 70b is disposed in the second recess 1513b and is flush to the second end surface 1511b, and the second magnetic conductive component 70b is located between a first cable 20b and a second cable 30b.

In this embodiment, the first magnetic conductive component 60b and the second magnetic conductive component 70b are not restricted to be respectively flush to the first end surface 411b and the second end surface 1511b; in some other embodiments, the first magnetic conductive component and the second magnetic conductive component may respectively protrude from the first end surface and the second end surface. In such a case, the first electrical connection portion of the first cable and the second electrical connection portion of the second cable may be more protruding so as to be in electrical contact with the electrically conductive piston when the electrically conductive piston is in the electrically connected position. In another embodiment, the first magnetic conductive component and the second magnetic conductive component may be respectively embedded in the wide portion of the electrically conductive piston and the inner part of the wire fixing part and are respectively distanced from the first end surface and the second end surface.

As shown in FIGS. 7 and 8, in the hydraulic switch 1c, an annular part 14c of a casing 10c and an outer part 152c of a wire fixing part 15c are made of electrically conductive material, and an inner part 151c of the wire fixing part 15c is made of insulation material. The inner part 151c of the wire fixing part 15c are electrically insulated from the outer part 152c, and the outer part 152c is electrically connected to the annular part 14c of the casing 10c. A first cable 20c is disposed through the inner part 151c, and part of the first cable 20c is clamped by a first main body 1514c and a second main body 1515c of the inner part 151c, and the first cable 20 is electrically insulated with the first main body 1514c and the second main body 1515c. A first electrical connection portion 21c of the first cable 20c is in a second portion 112c of a chamber of the casing 10c. Part of a second cable 30c is, for example, embedded in the inner part 151c and located between the first main body 1514c and the second main body 1515c, and a second electrical connection portion 31c of the second cable 30c is in electrical contact with the outer part 152c so as to electrically connect the second cable 30c with the annular part 14c. An electrically conductive piston 40c is in electrical contact with the annular part 14c. A first magnetic conductive component 60c and a second magnetic conductive component 70c are, for example, magnets in circle shape. The first magnetic conductive component 60c is disposed in a recess 413 of a wide portion 41c of the electrically conductive piston 40c, and the second magnetic conductive component 70c is embedded in the inner part 151c and is distanced from an end surface 1511c of the inner part 151c.

When the electrically conductive piston 40c is in an electrically connected position, the wide portion 41c of the electrically conductive piston 40c is in electrical contact with the first electrical connection portion 21c so as to electrically connect the first cable 20c with the second cable 30c via the annular part 14c and the outer part 152c. When the electrically conductive piston 40c is in an electrically disconnected position, the wide portion 41c of the electrically conductive piston 40c is spaced apart from the first electrical connection portion 21c and thus electrically disconnecting the first cable 20c from the second cable 30c.

All of the aforementioned hydraulic switches can be applied to a hydraulic brake system of a bicycle, and the following paragraphs take the hydraulic switch 1 for instance.

Figure 9:
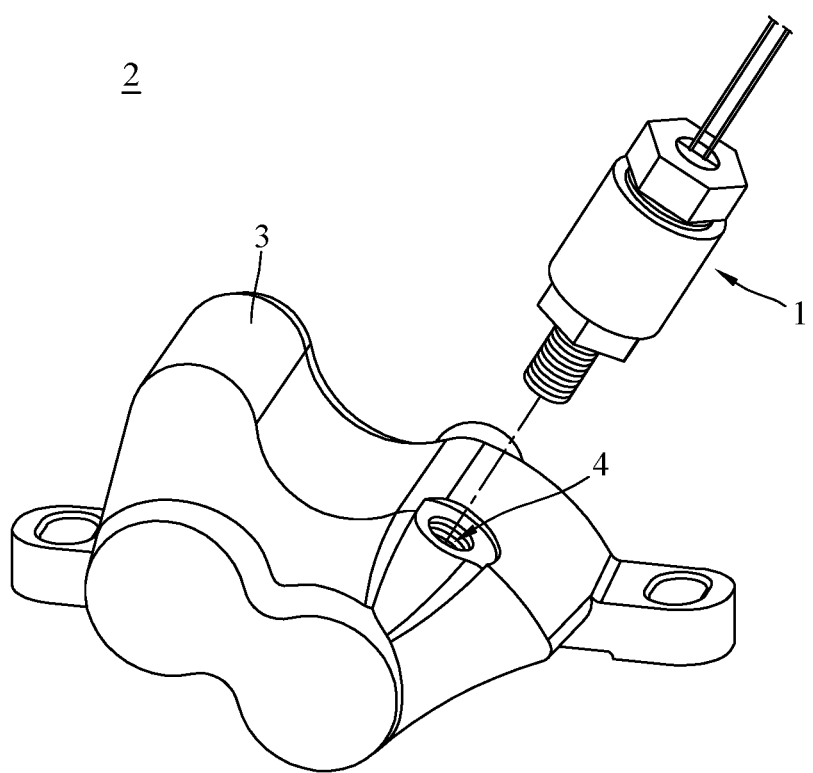
FIG. 9 is a schematic view of a hydraulic brake system according to a fifth embodiment of the disclosure.

Please refer to FIG. 9, and FIG. 9 is a schematic view of a hydraulic brake system according to a fifth embodiment of the disclosure. This embodiment provides a hydraulic brake system 2 including a caliper 3 and the hydraulic switch 1. The caliper 3 has an oil inlet 4, and the hydraulic switch 1 is disposed at the oil inlet 4 of the caliper 3.

Figure 10:
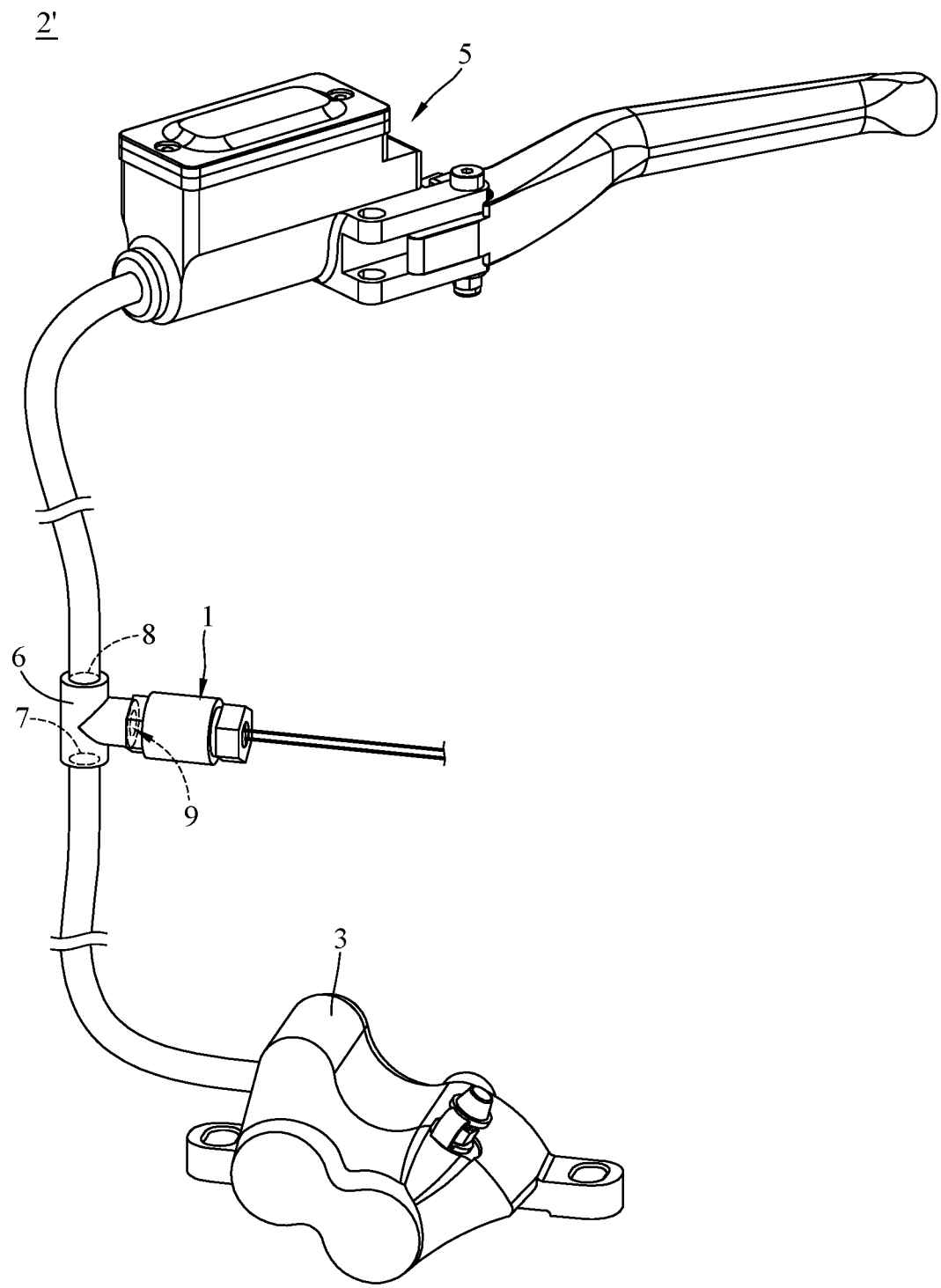
FIG. 10 is a schematic view of a hydraulic brake system according to a sixth embodiment of the disclosure.

Then, please refer to FIG. 10, and FIG. 10 is a schematic view of a hydraulic brake system according to a sixth embodiment of the disclosure. This embodiment provides a hydraulic brake system 2' including the caliper 3, a brake lever 5, the hydraulic switch 1 and a three-way connector 6. The three-way connector 6 has a first opening 7, a second opening 8 and a third opening 9 that are respectively connected to the caliper 3, the brake lever 5 and the hydraulic switch 1.

According to the hydraulic switches and the hydraulic brake systems as discussed above, the electrically conductive piston can be moved from the electrically connected position to the electrically disconnected position by using the repulsion force or the attraction force produced by the first magnetic conductive component and the second magnetic conductive component, such that the overall volume of the hydraulic switch can be small comparing to using spring to move the piston. Therefore, the hydraulic switch has a smaller effect on the appearance of the bicycle.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A hydraulic switch, comprising:
a casing, having a chamber and a liquid channel connected to the chamber;
a first cable, having a first electrical connection portion, wherein the first cable is disposed through the casing, and the first electrical connection portion is located in the chamber;
a second cable, having a second electrical connection portion, wherein the second cable is disposed through the casing, and the second electrical connection portion is located in the chamber;
an electrically conductive piston, disposed in the chamber and movable between an electrically connected position and an electrically disconnected position, wherein the electrically disconnected position is located closer to the liquid channel than the electrically connected position; when the electrically conductive piston is in the electrically connected position, the electrically conductive piston is in electrical contact with the first electrical connection portion and the second electrical connection portion so as to electrically connect the first cable with the second cable; when the electrically conductive piston is in the electrically disconnected position, the electrically conductive piston is spaced apart from the first electrical connection portion and the second electrical connection portion; and
a first magnetic conductive component, disposed on the electrically conductive piston and configured to provide a magnetic force to move the electrically conductive piston toward the electrically disconnected position;
wherein the hydraulic switch further comprises a second magnetic conductive component, the first magnetic conductive component and the second magnetic conductive component are magnets that are set to repel each other, and the second magnetic conductive component is disposed on the casing.

2. The hydraulic switch according to claim 1, wherein the casing comprises an end part, an annular part and a wire fixing part, the annular part is connected to and located between the end part and the wire fixing part, the end part, the wire fixing part and the annular part together form the chamber, the liquid channel penetrates through the end part, and the first cable and the second cable is disposed through the wire fixing part.

3. The hydraulic switch according to claim 2, wherein the second magnetic conductive component is disposed on the wire fixing part.

4. The hydraulic switch according to claim 3, wherein the wire fixing part includes an outer part and an inner part, the outer part is sleeved on the inner part, the outer part is mounted to the annular part, the first cable and the second cable is disposed through the inner part, and the second magnetic conductive component is disposed on the inner part.

5. The hydraulic switch according to claim 4, wherein the electrically conductive piston has a first recess, the inner part has a second recess, and the first magnetic conductive component and the second magnetic conductive component are respectively disposed in the first recess and the second recess.

6. The hydraulic switch according to claim 4, wherein the inner part of the wire fixing part includes a first main body and a second main body, at least part of the first cable and at least part of the second cable are clamped by the first main body and the second main body, and the outer part is sleeved on the first main body and the second main body.

7. The hydraulic switch according to claim 3, wherein the second magnetic conductive component is in an annular shape, and the second magnetic conductive component surrounds the first cable and the second cable.

8. The hydraulic switch according to claim 3, wherein the second magnetic conductive component is located between the first cable and the second cable.

9. The hydraulic switch according to claim 1, further comprising a sealing ring sleeved on the electrically conductive piston and clamped by the electrically conductive piston and the casing.

10. A hydraulic brake system, comprising:
a caliper, having an oil inlet; and
the hydraulic switch according to claim 1, wherein the hydraulic switch is disposed in the oil inlet of the caliper.

11. A hydraulic brake system, comprising:
a caliper;
a brake lever;
the hydraulic switch according to claim 1; and
a three-way connector, having a first opening, a second opening and a third opening that are respectively connected to the caliper, the brake lever and the hydraulic switch.

12. A hydraulic switch, comprising:
a casing, having a chamber and a liquid channel connected to the chamber;
a first cable, disposed through the casing and electrically insulated with the casing, wherein the first cable has a first electrical connection portion, and the first electrical connection portion is located in the chamber;
a second cable, disposed on the casing, wherein the second cable has a second electrical connection portion, and the second electrical connection portion is electrically connected to the casing;
an electrically conductive piston, disposed in the chamber and in electrical contact with the casing, wherein the electrically conductive piston is movable between an electrically connected position and an electrically disconnected position, the electrically disconnected position is located closer to the liquid channel than the electrically connected position; when the electrically conductive piston is in the electrically connected position, the electrically conductive piston is in electrical contact with the first electrical connection portion so as to electrically connect the first cable with the second cable; when the electrically conductive piston is in the electrically disconnected position, the electrically conductive piston is spaced apart from the first electrical connection portion; and
a first magnetic conductive component, disposed on the electrically conductive piston and configured to provide a magnetic force to move the electrically conductive piston toward the electrically disconnected position.

13. The hydraulic switch according to claim 12, wherein the casing comprises an end part, an annular part and a wire fixing part, the annular part is connected to and located between the end part and the wire fixing part, the end part, the wire fixing part and the annular part together form the chamber, the liquid channel penetrates through the end part, the first cable is disposed through and electrically insulated with the wire fixing part, the second cable is disposed on the wire fixing part, the second electrical connection portion of the second cable is electrically connected to the annular part, and the electrically conductive piston is in electrical contact with the annular part.

14. The hydraulic switch according to claim 13, further comprising a second magnetic conductive component, wherein the first magnetic conductive component and the second magnetic conductive component are magnets that are set to repel each other, and the second magnetic conductive component is disposed on the wire fixing part.

15. The hydraulic switch according to claim 14, wherein the wire fixing part comprises an outer part and an inner part, the outer part is sleeved on the inner part, the inner part is electrically insulated with the outer part, the outer part is mounted to the annular part and is in electrical contact with the annular part, the first cable is disposed through and electrically insulated with the inner part, the second electrical connection portion of the second cable is in electrical contact with the outer part, and the second magnetic conductive component is disposed on the inner part.

16. The hydraulic switch according to claim 15, wherein the electrically conductive piston has a recess, the first magnetic conductive component is disposed in the recess, a side of the inner part close to the electrically conductive piston has an end surface, the second magnetic conductive component is embedded in the inner part and is distanced from the end surface.

17. The hydraulic switch according to claim 15, wherein the inner part of the wire fixing part includes a first main body and a second main body, at least part of the first cable is clamped by the first main body and the second main body, and the outer part is sleeved on the first main body and the second main body.

18. The hydraulic switch according to claim 13, further comprising a second magnetic conductive component, wherein the second magnetic conductive component is a magnet, the first magnetic conductive component is made of ferrous material, and the second magnetic conductive component is disposed on the end part of the casing.

19. The hydraulic switch according to claim 13, further comprising a second magnetic conductive component, wherein the second magnetic conductive component is made of ferrous material, the first magnetic conductive component is a magnet, and the second magnetic conductive component is disposed on the end part of the casing.

20. The hydraulic switch according to claim 12, further comprising a sealing ring sleeved on the electrically conductive piston and clamped by the electrically conductive piston and the casing.

* * * * *